July 12, 1966 J. M. A. TEIXEIRA 3,260,065
COLD STORAGE FOR CHILLED PRODUCTS
Filed May 13, 1964 3 Sheets-Sheet 3
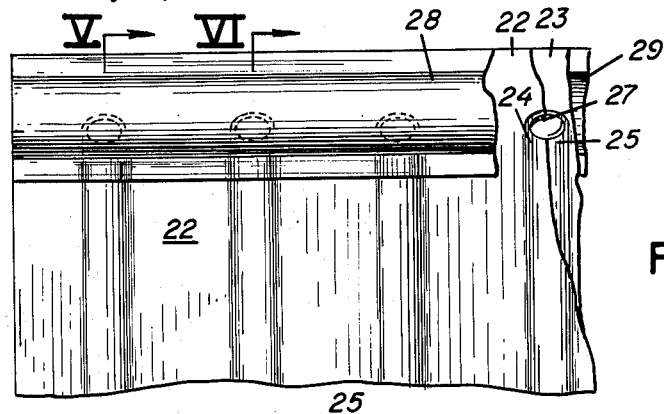
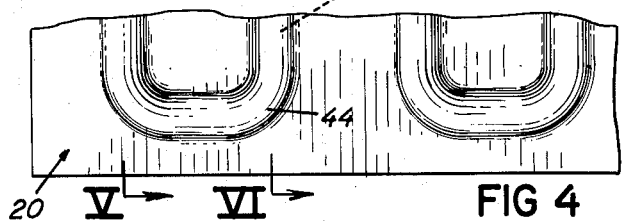
FIG 4
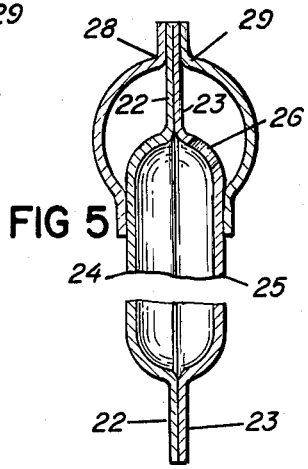
FIG 5
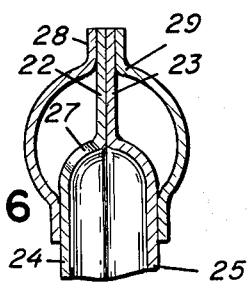
FIG 6
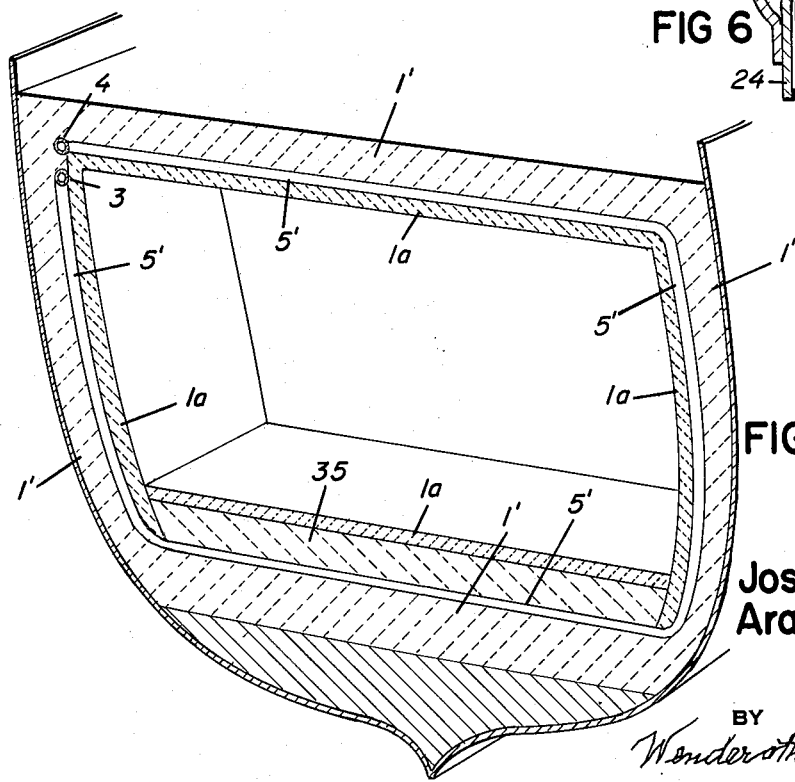
FIG 7
José Miguel
Araújo Teixeira
INVENTOR
BY
Wenderoth, Lind & Ponack
ATTORNEYS

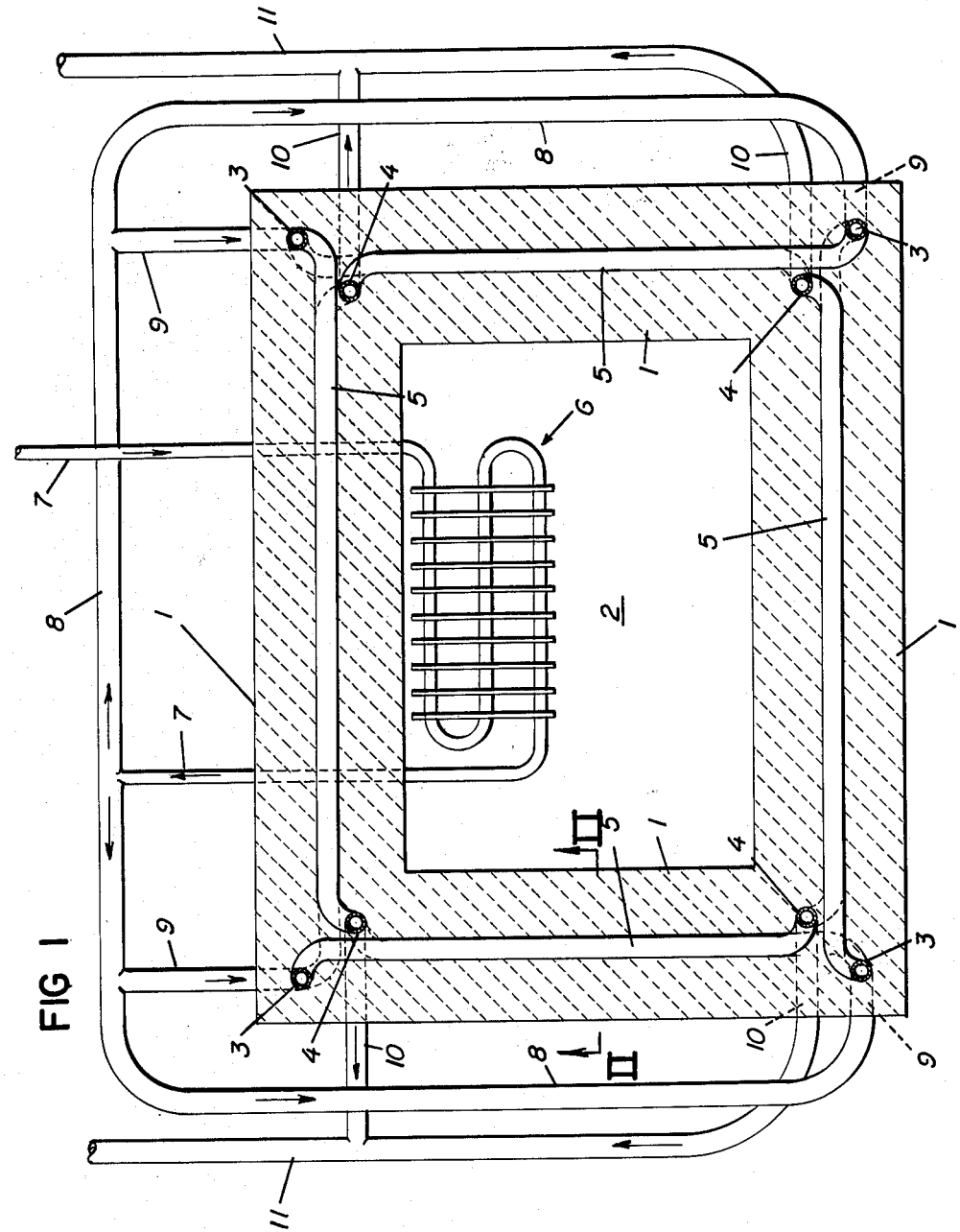

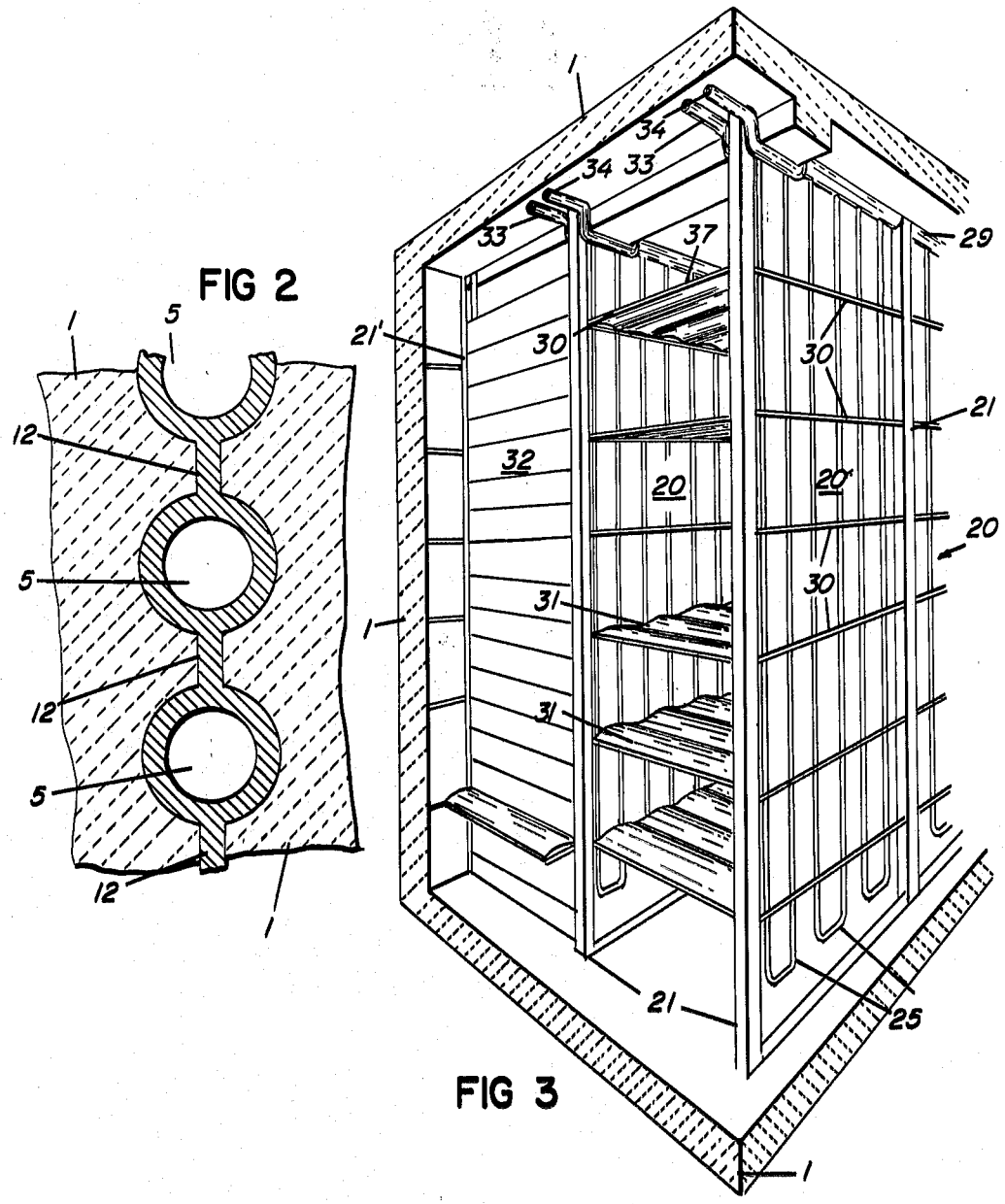

United States Patent Office 3,260,065
Patented July 12, 1966

3,260,065
COLD STORAGE FOR CHILLED PRODUCTS
Jose Miguel Araujo Teixeira, Lisbon, Portugal, assignor to Construcoes Continental Limitada, Lisbon, Portugal
Filed May 13, 1964, Ser. No. 367,031
Claims priority, application Germany, Apr. 1, 1964, C 32,534
4 Claims. (Cl. 62—240)

This invention relates to a cold storage chamber for chilled products, particularly fish, in ships, and more especially concerns a cold storage chamber comprising a heat exchanging duct system which provides for the circulation of a refrigerant through substantially all inside walls of the chamber as well as inside the chamber itself.

A well known problem in storing perishable goods such as food products is that of chilling the products by the maintenance of a temperature which will keep them fresh and at the same time prevent them from losing water and prevent ice from being deposited on the products, walls and equipment inside the cold storage chamber. This problem is one of considerable importance to deep sea fishermen because the duration of a fishing voyage depends upon the efficiency of the cold storage system in keeping the catch fresh. The longer the period during which the catch can be kept fresh on board ship the longer the time spent in the fishing area and the shorter the time unproductively spent in sailing back and forth to and from port.

Cold storage chambers, particularly for chilled fish on ships, in which the walls of the chamber consist of a heat insulating material which substantially prevents the penetration of heat from the outside are already known. However, these known types of chamber have the drawback that the circulation of air between the stacked products and at the walls varies considerably, some areas assuming surface temperatures which differ from the temperature of adjoining parts of the walls and the air temperature varying in different parts of the chamber. Since in cold storage chambers the humidity of the air is usually near 100% these temperature differences between the air and different parts of the chamber walls cause condensation and hence the formation of ice on the walls. Differential temperatures and their undesirable consequences are particularly likely to occur when the chamber is filled by continual addition of fresh material which has a temperature differing from the temperature inside the cold storage chamber.

Moreover, since heat insulation of a kind which can be economically produced never completely prevents the transmission of heat, some parts of the chamber walls tend to become warmer with a consequent drop in the relative humidity of the air which then absorbs water from the stored products and upon being cooled deposits this moisture on other parts of the wall or on the products themselves. This mechanism likewise causes condensation on the products or on sections of wall and hence leads to icing. Particularly in the cold storage of fish, these tend to freeze together into large blocks and the discharge of such a cargo as well as further processing of the fish may then be a matter presenting considerable difficulties since the blocks of ice and fish must first be broken up and this may sufficiently damage a substantial number of fish to make them unsuitable for subsequent processing.

In order to reduce these undesirable occurrences to within acceptable limits it is necessary when using conventional cold storage chambers comprising an ordinary insulated wall and a heat exchanger system inside the chamber through which a refrigerant is conducted, that the stacked products must be so arranged that there are wide intervening spaces between the stacks and between them and the surfaces of the walls and of the heat exchanging elements. The useful capacity of such a chamber is thus considerably reduced.

It is therefore the object of the present invention to provide a cold storage chamber, particularly a fish hold for fishing vessels, in which the temperature required is maintained inside the chamber, and in the racks and products themselves, such as fish, even when the products are cooled to cold storage temperature, without substantial temperature differentials being created.

It is another object of the invention to provide a cold storage chamber in which the moisture content of the products during storage, particularly the moisture content of fish, is maintained during the voyage of the fishing vessel at the temperature level required for subsequent processing, and in which the minimum temperature needed to keep the products fresh is such that in further processing by rapid refrigeration the consequences of slow freezing are avoided.

A further object of the invention is to provide a storage chamber in which the goods can be stored in the hitherto conventional manner, so that special training of personnel is unnecessary, and in which any increase in the space required for accommodating the cold storage chamber with a view to improving efficiency is avoided, particularly in fishing vessels.

In the construction of the invention these requirements are fulfilled by taking two essential steps. The first of these is to provide an "active" insulation, that is to say an insulation which not only substantially reduces the transmission of heat but which also removes heat which may penetrate into the wall from outside and the second is to provide as uniform as possible a distribution of the heat exchanging surfaces throughout the chamber within the minimum possible space. The first step is realised by providing a duct system for the refrigerant which acts as a heat exchanging system inside the chamber wall and by covering this duct system both externally and internally with a heat insulating layer. In this context the term "chamber wall" is understood to mean not only the side walls but also the roof, the floor and any other wall surfaces of the chamber.

In cold storage chambers the provision of a pipe system for the refrigerant inside the chamber wall, that is to say the employment of the wall itself as a heat exchanging surface, is an arrangement already known to the art. However, in known installations of this kind the pipe system is connected by a layer of heat conducting material, generally a metal layer, with the interior of the chamber to provide a substantially unimpeded heat exchange between the chamber and the refrigerant. In the arrangement proposed by the invention the duct or pipe system inside the walls extracts substantially no heat from the interior of the chamber. The purpose of locating the pipe system for the refrigerant inside the insulating wall is rather to extract heat penetrating the insulating layer from the outside before it can reach the internal surface of the chamber wall, whereas the insulating layer on the inside prevents heat from being extracted from inside the chamber so that the inside chamber wall will in fact assume the temperature of the air the chamber contains. Even a relatively thin insulation will then definitely and reliably prevent the stored goods from losing cold and prevent condensation occurring on the chamber wall surfaces. Thus the temperature of all the inside surfaces enclosing the chamber is kept at a substantially completely uniform temperature.

If the duct system for the refrigerant consists of pipes extending side by side, then these pipes are preferably interconnected by fins made of a material which is a good conductor of heat. This produces a continuous heat conducting layer which prevents heat from passing through the gaps between the pipes of the system and through the insulating layer to the inside surface of the chamber wall. In a manner already known to the art the refrigerant may be conducted in countercurrent through neighbouring pipes.

The path of the refrigerant is preferably so contrived that it is first taken from the refrigerating machine through a cooling system in the interior of the chamber for establishing the required inside temperature and then through the pipe system located in the walls before returning to the refrigerating machine.

In order to ensure a substantially uniform extraction of heat from the freshly stored products, principally fish, throughout the chamber without encroaching substantially upon the space in the chamber and also in order to generate as low as possible a temperature differential between the heat exchanging surfaces and the temperature inside the chamber and thereby reducing air motion to a minimum, the supporting frames and/or the vertical partitions between these frames, such as fish racks, are constructed so as to function as cooling elements. The upright supports of the fish racks may be formed by one or more pipe loops provided with suitable connections, preferably under the roof of the cold storage chamber, for the circulation of the refrigerant.

If the supporting frames of the fish racks are partitions it is preferred to incorporate channel loops for the refrigerant in said partitions these loops consisting of a good heat conducting material, such as corrosion-resistant steel, said channel loops communicating with a common supply duct at the top of the partitions. The partitions may consist of two adjacent interconnected plates between which the channel loops are formed by appropriately formed trough-shaped impressions in the plates. The common supply ducts at the top of the partitions may be formed by trough sections attached to opposite edges at the top of the plates.

Moreover, in order to obviate the possibility of ice forming on the floor of the cold storage chamber, due for instance to sea water dripping off freshly caught fish, an efficient drainage of drip water can be assured by providing the floor of the cold storage chamber with a thicker insulating layer than the side walls, so that the extraction of heat through the floor is even less than that through the walls.

The invention will now be described in greater detail by reference to embodiments shown in the drawings in which:

FIGURE 1 is a vertical section of a cold storage chamber according to the invention, in which the circulating supply system which carries the refrigerant between the several ducts or pipes is indicated by dot-dash lines, FIGURE 2 is a section of the pipe system taken on the line II—II in FIGURE 1, FIGURE 3 is a perspective view of part of a cold storage chamber equipped with partitions between the fish trays which are arranged to function as heat exchanging elements, the pipe system inside the walls as shown in FIGURE 1 is not shown in this drawing, FIGURE 4 is a plan view of the upper edge of a partition in a cold storage chamber of the kind illustrated in FIGURE 3, FIGURE 5 is a section taken on the line V—V in FIGURE 4, on a larger scale, FIGURE 6 is a likewise larger scale section taken on the line VI—VI in FIGURE 4, and FIGURE 7 is a perspective sectional view of the hull of a fishing vessel containing a cold storage chamber with a floor provided according to the invention with a thicker insulating layer.

The insulating wall of the cold storage chamber 2 shown in FIGURES 1, 2 and 7 contains a system of parallel pipes 5.

This system of pipes in the embodiment according to FIGURES 1 and 2, comprises feed pipes 3 and return pipes 4 at each corner of the chamber parallel to the side walls. Each of the pipes 5 extends from a feed pipe 3 to a return pipe 4 from corner to corner, and the pipes 5 are so connected to the feed and return pipes 3 and 4 that the refrigerant flows through neighbouring pipes in opposite directions of flow.

The thickness of the insulating walls and the transfer of heat therethrough is so chosen by reference to the thermal conductivity of the insulating material and the temperature difference between the desired temperature level in the cold storage chamber 2 and the temperature of the refrigerant that a temperature gradient is maintained towards the system of pipes 5 both in the insulating layer outside the pipes 5 and in the insulating layer situated on the inside of the pipes. Under normal conditions the temperature gradient across the insulating layer between the inner face of wall 1 and the pipe system is very slight and a substantial transfer of heat will therefore only occur when the temperature on the inside of the wall rises. Even when the temperature gradient is relatively high and heat is therefore transferred from the inside of the chamber 2 through the insulating layer into the pipe system 5 the insulating effect of the layer will always ensure that the temperature of the inside face of wall 1 is always substantially equal to the temperature of the air inside the chamber.

A cooling system 6 is provided inside chamber 2. This is designed to extract that heat from the inside of the chamber which is introduced by the product itself when this is loaded or by personnel entering the chamber. The ducts of this cooling system are so connected that the refrigerant from a refrigerating machine (not shown in the drawing) first enters the cooling system 6 through a pipe 7 and after having passed through the cooling system flows out through pipes 7, 8 and 9 into the admission pipes 3 of the pipe system 5 in the walls. Having passed through these pipes 5 the refrigerant is returned to the refrigearting machine from pipes 4 through the return pipes 10 and 11.

Even when the pipes 5 in a relatively simple and cheap arrangement are fairly widely spaced, the generation of a temperature gradient across the insulating layer from the outside to the inside of the wall through the gaps between the pipes is prevented by interconnecting the pipes 5 by interposed fins 12 of good heat conducting material as shown in FIGURE 2. These fins with the pipes thus constitute an unbroken heat extracting surface in the interior of the insulating layer 1.

In FIGURES 3 to 6 the construction of the partitions for the fish racks which constitute the heat exchanging elements is illustrated. Each partition section 20 is inserted between upright supports 21. From FIGURES 4, 5 and 6 it will be seen that each section 20 consists of two adjacent plates 22 and 23 with trough-shaped impressions 24 and 25 which together constitute a channel in the form of a loop or upright U when the plates are joined face to face. The plates 22 and 23 are connected together in fluid-tight manner such as by brazing or welding at least around the edges of the trough-shaped impressions.

At the upper end of these impressions 24, 25 openings 26, 27 are provided alternately on each side of each section 20. Where the upper ends of the impressions 24, 25 the outside faces of the plates 22, 23 are connected to trough sections 28 and 29 in fluid-tight manner, such as by brazing or welding. These trough sections 28, 29 form main supply ducts for the channels formed by the impressions 24, 25 through which the refrigerant passes. The loops or U-shaped channels formed by the impressions 24 and 25 communicate at one end of the U with the duct formed by trough section 28 (FIGURE 5) and at the other end of the U with the duct (FIGURE 6) formed by trough section 29. Therefore, if one of the troughs serves for the admission and the other for the return of the refrigerant all the U-shaped channels will be connected in parallel between common admission and return ducts. This arrangement ensures that the refrigerant will flow in uniform distribution through all the partitions of the fish racks 20. Beacuse of the good thermal conductivity of the plates 22, 23 the entire surface of the partitions of the racks will therefore assume an even temperature, as required for the cold storage of fish.

The partitions are provided with ribs 30 which extend across the supply ducts and which are adapted to support the trays 31 which carry the fish. When one row of racks has been completely filled it can be closed by the slidable insertion of doors 32 into appropriate slots in the supports 21 or in auxiliary supports 21' attached to the wall surfaces of the cold storage chamber.

The feeder and return system of ducts formed by the troughs 28 and 29 can be connected by pipe junctions 33, 34 at the top of each section 20 with the main refrigerant supply pipes under the roof of the cold storage chamber. The entire arrangement can be such that it can be progressively extended as the fish racks are filled.

In the modified form of construction according to FIGURE 7 the insulating layer 1' which encloses the cold storage chamber 2' on all sides contains a pipe system 5' connected at one corner of the wall of chamber 2' to common supply pipes 3' and 4'. An internal insulating layer 1a is located on the inside of pipe system 5'. On the floor an additional insulating layer 35 is interposed between insulating layer 1a and the pipe system. The extraction of heat through the floor is therefore less than through the other inside surfaces of the cold storage chamber. This arrangement prevents water dripping off freshly loaded fish from freezing on the floor and from forming a layer of ice which would be a nuisance to personnel and could cause other trouble.

I claim:

1. A cold storage chamber for chilled products, particularly chilled fish in ships, comprising a heat exchanging system of ducts through which a refrigerant is circulated, said system being arranged inside the walls of said chamber and, as a cooling system, in the interior of said chamber, said system arranged in the walls of said chamber being covered both on the outside and on the inside with a thermally insulating layer, said duct system in said chamber walls comprising a plurality of parallel pipes and intermediate fins formed of a heat conducting material interconnecting said pipes, racks for the storage of products to be chilled in said chamber, said racks having vertical partitions forming part of said cooling system, and said vertical partitions of said racks comprising pipe loops having connections which communicate with the refrigerant system.

2. A cold storage chamber for chilled products, particularly chilled fish in ships, comprising a heat exchanging system of ducts through which a refrigerant is circulated, said system being arranged inside the walls of said chamber and, as a cooling system, in the interior of said chamber, said system arranged in the walls of said chamber being covered both on the outside and on the inside with a thermally insulating layer, said duct system in said chamber walls comprising a plurality of parallel pipes and intermediate fins formed of a heat conducting material interconnecting said pipes, racks for the storage of products to be chilled in said chamber, said racks having vertical partitions forming part of said cooling system, said partitions being formed of a heat conducting material containing channel loops for the circulation therethrough of the refrigerant, said channel loops communicating with a common supply duct at the top of the partitions.

3. A cold storage chamber according to claim 2, wherein said partitions comprise two adjacent interconnected plates and said channel loops comprise cooperating trough-like impressions formed in said plates.

4. A cold storage chamber according to claim 3 wherein the common supply ducts at the top of a partition are formed by trough sections attached to opposite upper surfaces of the partitions to which they are connected in a fluid-tight manner.

References Cited by the Examiner

UNITED STATES PATENTS

| | | | |
|---|---|---|---|
| 161,976 | 4/1875 | Martin et al. | 62—442 X |
| 1,444,589 | 2/1923 | Capeman | 62—442 X |
| 2,212,912 | 8/1940 | Booth | 62—525 X |
| 2,244,475 | 6/1941 | Raskin | 62—526 |
| 2,428,243 | 9/1947 | Raskin | 62—251 |
| 2,576,665 | 11/1951 | Bixler. | |
| 2,900,175 | 8/1959 | McGuffey | 62—525 X |
| 2,909,040 | 10/1959 | Newell | 62—240 X |
| 2,931,192 | 4/1960 | Weinberg | 62—240 |
| 2,968,933 | 1/1961 | Pfeifer et al. | 62—240 X |
| 3,005,317 | 10/1961 | Bunn | 62—240 X |

ROBERT A. O'LEARY, *Primary Examiner.*

LLOYD L. KING, *Examiner.*